3,192,042
METHOD OF FORMING A CERMET
Henry S. Spacil, Schenectady, N.Y., assignor to General
Electric Company, a corporation of New York
No Drawing. Filed Aug. 1, 1961, Ser. No. 128,376
6 Claims. (Cl. 75—206)

The invention relates to cermets and more particularly to improved methods of forming cermet powders and articles.

Presently, cermets are produced by mixing mechanically a ceramic and a metal. Such mixing can be accomplished by ball-milling or blending to produce a cermet powder. After mixing, the ceramic and metal powders are pressed into a compact and sintered to form the desired cermet article. Such articles are useful for structural members at high temperature, electrical resistors, and cutting tools. Reduction of oxides is also employed to produce cermets wherein the metallic oxide and ceramic are mixed, the oxide is reduced to its respective metal, the powder is pressed into a compact, and the compact in sintered to produce an article. Additionally, metals and metal hydrides are mixed with a ceramic and pressed to form a compact which is sintered to produce an article. During the initial phases of the sintering, the hydride decomposes to its respective metal.

Non-uniform distribution of the metal around the ceramic particles and poor cohesion between the metal particles are problems in present production of cermets. Thus, it would be desirable to provide a method of forming cermets in which uniform distribution of the metal around the ceramic particles and a high degree of cohesion between metal particles are achieved.

It is an object of my invention to provide a method of forming cermet powders and articles.

It is another object of my invention to provide a method of forming cermets in which the desired metal in the form of a compound is added to the ceramic.

It is a further object of my invention to provide a method of forming cermets in which the metal in the form of a metallic halide whose metal is selected from the group consisting of iron, nickel, cobalt, chromium, and copper is added to the ceramic.

In carrying out my invention in one form, a method of forming a cermet comprises providing at least one metallic halide in which the metal is selected from the group consisting of iron, nickel, cobalt, chromium, and copper, and adding a refractory oxide powder to the halide.

These and various other objects, features and advantages of the invention will be better understood from the following description:

I found unexpectedly that a metal in the form of a metallic halide powder having a metal selected from the group consisting of iron, nickel, cobalt, chromium, and copper, could be dissolved in a non-aqueous solvent having a high solubility for the halide and that a ceramic could be mixed in the formed solution. Subsequently, the solvent is evaporated to result in a powder which is then heated in a hydrogen atmosphere to reduce the metallic halide to its respective metal without vaporizing the halide and without sintering the metal to produce a finely divided cermet powder. Such powder can then be formed into a coherent compact and sintered at an elevated temperature to form a cermet article.

My method of forming a cermet includes various ceramics, for example, aluminum oxide, zirconium oxide, magnesium oxide, and other ceramic compositions based on these oxides and with additions of silica and small amounts of other oxides. I found that the metallic halide should be a halide in which the metal is selected from the group consisting of iron, nickel, cobalt, chromium and copper. Additionally, I prefer to employ the chlorides and bromides of these metals rather than the iodides. The solvent should be non-aqueous with a high solubility for the halide which is employed. For example, methanol, ethanol and acetone are suitable non-aqueous solvents for use in my method for forming such cermets.

I found also that such metallic halide powder can be blended with a ceramic powder. The blended powder is placed in a reducing atmosphere whereby the metallic halide is reduced to its metal to form a cermet in powder form. Subsequently, the powder can be pressed to form a coherent compact and the compact is sintered to produce a cermet article.

I found further that such metallic halide powder can be added to a ceramic powder to provide a cermet in powder form. Subsequently, the powder can be pressed to form a coherent compact which is placed in a reducing atmosphere to reduce the metallic halide to its metal. The compact is then sintered to produce a cermet article.

The reduction in each of the above methods in one step from the metallic halide to the metal results in a high degree of cohesion between metal particles. The sintered compact resulting from the above methods provides a more uniform distribution of metal around the ceramic particles.

An example of a method of forming a cermet powder in accordance with the present invention is as follows:

Nickel chloride and chromium chloride were blended together in amounts sufficient to provide 80 weight percent of nickel and 20 weight percent of chromium. Approximately 30 percent by volume of forsterite powder was blended with the chloride powders. The powder was then placed in boats and heated to 600° C. in hydrogen to reduce the nickel chloride and chromium to nickel and chromium. No appreciable vaporization of the chlorides occurred at this temperature. Furthermore, this reduced temperature was low enough to prevent sintering of the reduced metals.

An example of a method of forming a cermet article in accordance with the present invention is as follows:

Nickel chloride and chromium chloride were blended together in amounts sufficient to provide 80 weight percent of nickel and 20 weight percent chromium. Approximately 30 percent by volume of forsterite powder was blended with the chloride powders. This resultant powder was pressed at about 1000 pounds per square inch to form a coherent compact that was handled readily. The compact was then heated slowly to 1150° C. in hydrogen to first reduce the nickel chloride and chromium chloride to nickel and chromium and to presinter the resultant metal. No appreciable vaporization of the chlorides occurred during the reduction. This compact was then sintered for one hour at 1300° C. The resultant cermet article had a more uniform distribution of metal around the ceramic particles.

While other modifications of this invention and variations of method which may be employed within the scope of the invention have not been described, the invention is intended to include such that may be embraced within the following claims.

What I claim as new and desire to secure by Letters Patent of the United States is:

1. A method of forming a cermet powder which comprises providing at least one metallic halide in which the metal is selected from the group consisting of iron, nickel, cobalt, chromium and copper dissolving said metallic halide in a non-aqueous organic solvent having a high solubility for said metallic halide, mixing a refractory oxide powder in the formed solution, evaporating said solvent to result in a powder, placing said powder in a reducing atmosphere, and reducing said metallic halide to the metal thereof.

2. A method of forming a cermet which comprises providing at least one metallic halide in which the metal is selected from the group consisting of iron, nickel, cobalt, chromium and copper, dissolving said metallic halide in a non-aqueous organic solvent having a high solubility for said metallic halide, mixing a refractory oxide powder in said solvent, evaporating said solvent to result in a powder, placing said powder in a reducing atmosphere, reducing said metallic halide to the metal thereof, pressing said powder a form a coherent compact, and sintering said compact.

3. A method of forming a cermet powder which comprises providing at least one metallic halide powder in which the metal is selected from the group consisting of iron, nickel, cobalt, chromium and copper, blending a refractory oxide powder with said halide, placing said blended powder in a reducing atmosphere, and reducing said metallic halide to the metal thereof.

4. A method of forming a cermet which comprises providing at least one metallic halide powder in which the metal is selected from the group consisting of iron, nickel, cobalt, chromium and copper, blending a refractory oxide powder with said halide, placing said blended powder in a reducing atmosphere, reducing said metallic halide to the metal thereof, pressing said powder to form a coherent compact, and sintering said compact.

5. A method of forming a cermet powder which comprises providing at least one metallic halide powder in which the metal is selected from the group consisting of iron, nickel, cobalt, chromium and copper, and adding a refractory oxide powder to said halide.

6. A method of forming a cermet which comprises providing at least one metallic halide powder in which the metal is selected from the group consisting of iron, nickel, cobalt, chromium and copper, adding a refractory oxide powder to said halide, pressing said powder to form a coherent compact, placing said compact in a reducing atmosphere, reducing said metallic halide to the metal thereof, and sintering said compact.

References Cited by the Examiner

UNITED STATES PATENTS 3,019,103　1/62　Alexander et al. _____ 29—182.5

FOREIGN PATENTS 626,653　7/49　Great Britain _____ 75—204
824,092　11/59　Great Britain _____ 117—100

CARL D. QUARFORTH, *Primary Examiner.*

OSCAR R. VERTIZ, REUBEN EPSTEIN, *Examiners.*